PERKINS & VANDERGRIFT.
Draft Equalizer.

No. 108,727.   Patented Oct. 25, 1870.

United States Patent Office.

WILLIAM M. PERKINS AND THEODORE F. VANDERGIFT, OF LA FONTAINE, INDIANA.

Letters Patent No. 108,727, dated October 25, 1870.

IMPROVEMENT IN DRAFT-EQUALIZERS.

The Schedule referred to in these Letters Patent and making part of the same.

*To all whom it may concern:*

Be it known that we, WILLIAM M. PERKINS and THEODORE F. VANDERGIFT, of La Fontaine, in the county of Wabash and State of Indiana, have invented a new and valuable Improvement in Draft-Equalizers; and we do hereby declare that the following is a full, clear, and exact description of the construction and operation of the same, reference being had to the annexed drawing making a part of this specification, and to the letters and figures of reference marked thereon.

Figure 1:
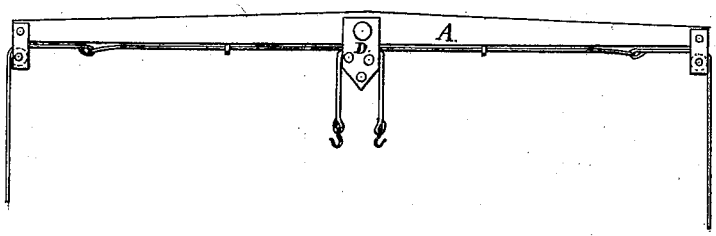

Figure 1 of the drawing is a top view of our invention.

Figure 2:
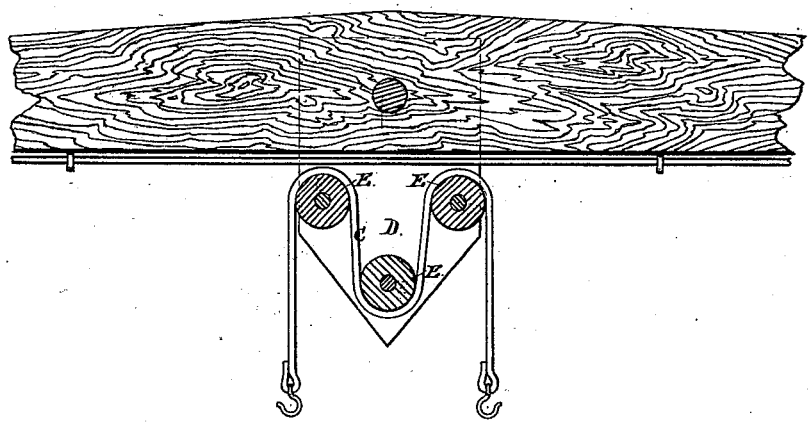

Figure 2 is a central horizontal section of the same.

Our invention relates to means for equalizing the draft of horses, and consists in the arrangement of the pulleys, over which the equalizing-strap, which connects the inner traces, passes, and the manner of pivoting the traces, to which the pulleys are attached, to the whiffletree.

The letter A of the drawing represents the whiffletree;

B, the equalizing-strap connecting the outer traces; and

C, the equalizing-strap connecting the inner traces.

D represents the plates, which protect the pulleys E, and to which they are attached.

In order to lessen the jar and strain upon each pulley, I employ three, and pass the strap C about them in the manner shown.

The plates D are pivoted to the whiffletree, so that they can turn freely to answer the strain upon that end of the equalizing-strap to which the pulling horse is attached, thus, obviating the difficulty under which all center pulleys labor, of causing the forward horse to pull against himself when they are attached by rigid arms or plates to the whiffletree; in other words, the axial line of the combination of pulleys always maintains a position parallel to the line of draft in my improvement, whereas, if the pulleys are attached by rigid arms, they constitute levers, against the action of which the forward horse must pull.

What we claim as our invention, and desire to secure by Letters Patent, is—

The combination and arrangement of the whiffletree A, pulleys E E E, equalizing-strap C, and pivoted plates D D, as specified.

In testimony that we claim the above, we have hereunto subscribed our names in the presence of two witnesses.

WM. M. PERKINS.
T. F. VANDERGIFT.

Witnesses:
JAS. A. BLOOD,
WELLINGTON LINES.